Nov. 30 1943.  J. H. PEARSON ET AL  2,335,441
MANUFACTURE OF DIPHENYL CARBONATES
Filed Aug. 2, 1940
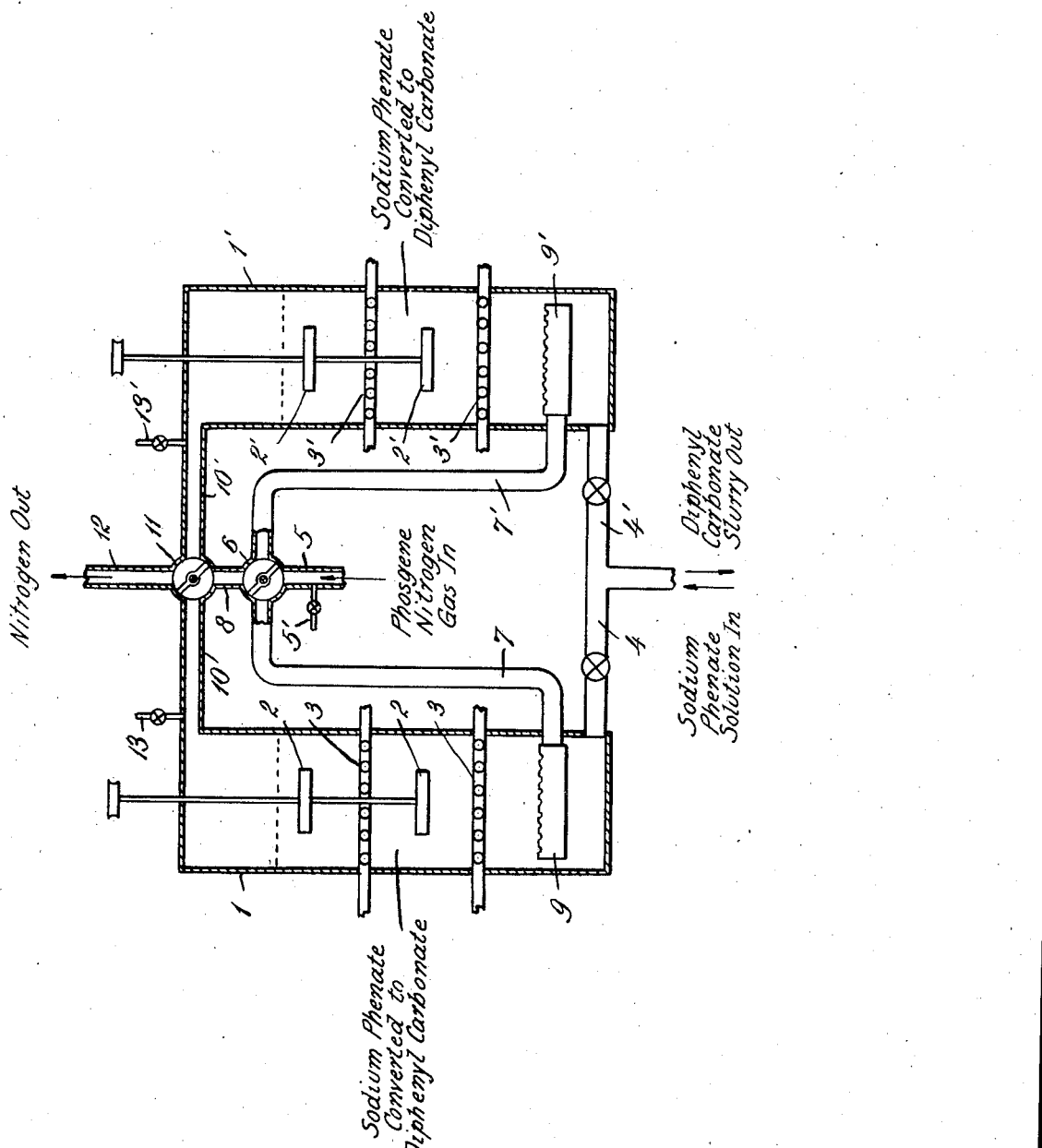
INVENTORS
John H. Pearson
Sager Tryon
BY
ATTORNEY Patented Nov. 30, 1943

2,335,441

UNITED STATES PATENT OFFICE 2,335,441

MANUFACTURE OF DIPHENYL CARBONATES

John H. Pearson, Flushing, and Sager Tryon, Elmhurst, N. Y., assignors to General Chemical Company, New York, N. Y., a corporation of New York Application August 2, 1940, Serial No. 349,562

8 Claims. (Cl. 260—463)

This invention relates to the manufacture of diphenyl carbonates and is particularly concerned with the reaction of phosgene and alkali phenates whereby the diphenyl carbonate is directly formed.

In the past it has been proposed to manufacture diphenyl carbonates by bringing phosgene into contact with an aqueous alkali phenate solution. The present invention is concerned with improvements in this type of process and particularly relates to carrying out the process by means of a phosgene-containing gas in which the phosgene concentration lies between 15% and 50%. The remainder of the gas mixture consists for the most part of nitrogen together with small quantities of other inert gases, such as carbon dioxide, which may be present incidentally.

The invention is also concerned with a particular method of controlling the reaction to secure high yields of the diphenyl carbonate on the basis of both phosgene and alkali phenate employed and with a method for conveniently determining the end-point of the reaction.

The process of the invention involves provision of a first alkali phenate solution and a second alkali phenate solution into contact with which the gas mixture containing 15% to 50% of phosgene is passed serially. During the reaction the temperature is maintained below 24° C. in each of the two portions of alkali phenate solution. The flow of phosgene-containing gas is normally regulated so that initially the gas stream entering the second portion of alkali phenate solution contains substantially no phosgene, e. g., not more than one or two percent. In other words, at the beginning of the reaction the first portion of solution effects substantially complete removal of phosgene from the gas mixture. However, as the reaction proceeds and the concentration of alkali phenate in the first portion of solution becomes reduced, the phosgene content of the effluent gas will gradually rise. This gas passes to the second portion of alkali phenate where residual phosgene is removed.

The reaction is allowed to continue until the effluent gas mixture from the first portion of the alkali phenate solution reaches a value within 2% of the concentration of phosgene in the gas mixture entering the first portion of alkali phenate solution.

During the reaction some phosgene reacts with water to form hydrochloric acid and this hydrochloric acid may react with alkali phenate to form substantial quantities of the free phenol. Accordingly the alkali phenate solutions, especially the solution in the first portion, contains a free phenol as well as alkali phenate.

When the gas analyses indicate a less than 2% difference in the phosgene contents of inlet and exit gas from the first portion of alkali phenate solution, the introduction of phosgene-containing gas is discontinued temporarily and the free phenol is neutralized by the addition of alkali. The introduction of phosgene-containing gas is then resumed at the same relatively constant rate previously employed and is continued until the phosgene concentration at the inlet and exit to the alkali phenate solution again attain a proximity within 2%.

At this point the reaction is terminated and the solid diphenyl carbonate in the first portion is mechanically separated from the aqueous solution. The aqueous solution may be exhausted to the sewer or treated for the removal of the small amounts of organic materials which it contains.

The second portion of alkali phenate, during the previous treatment with residual phosgene, will have had from 20% to 40% of its alkali phenate content converted to diphenyl carbonate. This mixture is now used as a first quantity of alkali phenate for a subsequent treatment with phosgene gas and a fresh alkali phenate solution is prepared to constitute the second quantity of alkali phenate.

It will be apparent that in normal operations the first alkali phenate solution initially contains a substantial proportion of diphenyl carbonate and a substantially lower proportion of alkali phenate than the second alkali phenate solution. The initial ratio of alkali phenate to diphenyl carbonate in the first portion of alkali phenate will be between about 3 and about 8 mols of alkali phenate for each mol of diphenyl carbonate. By the above process high yields of diphenyl carbonate, normally above 90% of theoretical based on the phenol consumed, are obtained.

The process may be conducted at ordinary atmospheric pressure or at elevated pressures. At least at pressures below about three atmospheres absolute it is preferable to maintain the temperature between 16° C. and 24° C.

Contact of the phosgene-containing gas and the aqueous alkali phenate solution may be effected in any convenient manner as by bubbling the gas through the liquid, spraying the liquid into the gas, or passing the liquid over surfaces exposed to the gas, for example, baffles or checkerwork.

The process of the invention may be further illustrated by a specific example of one method of conducting the process, suitable apparatus for which is illustrated in the accompanying drawing wherein the numerals 1 and 1' designate reaction vessels adapted for bringing sodium phenate liquor into intimate contact with phosgene-containing gas. The reaction vessels are supplied with agitating devices 2 and 2' for agitating the mixture and assisting dispersion of the gas in the liquid. The vessels 1 and 1' also are provided with cooling coils 3 and 3' for cooling the contents of the reaction vessels during the absorption of the phosgene. The reaction vessels are provided with liquid connections 4 and 4' for introducing and withdrawing liquid and solid contents from the reaction vessels. A gas inlet conduit 5, having a sampler bleed 5', leads to a two-way valve 6 connected with gas lines 7 and 7' and conduit 8. Gas lines 7 and 7' lead to gas distributing devices 9 and 9' within and near the bottom of reaction vessels 1 and 1'. At the top of vessels 1 and 1' conduits 10 and 10' lead to two-way valve 11 connected to exhaust conduit 12 and conduit 8. On conduits 10 and 10' valve-controlled outlets 13 and 13' are provided for sampling the gases in order to determine their composition.

In operation of the above apparatus at approximately atmospheric pressure the vessels 1 and 1' are filled as indicated with sodium phenate solution; for instance at the start, each of the vessels may be charged with about 2000 pounds of an aqueous 33½% sodium phenate solution by way of conduits 4 and 4'. The valves or dampers 6 and 11 for controlling flow in the gas lines of the system are then arranged as indicated in the drawing. A mixture of gases comprising about 25% phosgene and 74% nitrogen, the balance consisting of oxygen, carbon dioxide and other inert gases, and water vapor, passes through conduit 5 to valve 6 and thence through line 7 and bubbles up through the solution in vessel 1. The solution in vessel 1 is maintained in a state of turbulence by means of agitating device 2 during this period and the temperature is maintained at 21°±1° C. by circulation of cooling fluid through coils 3. Gas passes from vessel 1 by way of conduit 10, valve 11, conduit 8, valve 6, line 7' and distributor 9' into vessel 1' where it bubbles through the solution in this vessel and finally passes out through conduit 10', valve 11, and exhaust conduit 12. After seven or eight hours, samples of gas taken at 13 and 5' and analyzed for phosgene will indicate that the gas entering vessel 1' now has a phosgene content within about 1% of the phosgene content of the gas entering vessel 1. When this condition is attained, the flow of gas is stopped and sufficient sodium hydroxide solution is added to the contents of vessel 1 to neutralize free phenol which it may contain, as determined by sampling and testing for phenol. The introduction of the phosgene-containing gas is then resumed and continued until a sample of the gas at 13 again shows a phosgene content about 1% lower than the phosgene content of the gas entering vessel 1. The aqueous slurry of diphenyl carbonate in vessel 1 is then withdrawn through conduit 4 to a filter, not shown, for separation of solid diphenyl carbonate from mother liquor. Mother liquor, which contains little or no sodium phenate, may be exhausted to the sewer or otherwise disposed of.

A fresh charge of about 2000 pounds of aqueous 33½% sodium phenate solution is charged to vessel 1 and any free phenol in vessel 1' is neutralized. The settings of valves 6 and 11 are reversed so as to permit flow of gas through conduit 5, valve 6, line 7', distributor 9', and up through the liquid in vessel 1', then through conduit 10', valve 11, conduit 8, valve 6, line 7, distributor 9 and up through liquid in vessel 1. Residual gas is exhausted from vessel 1 by way of conduit 10, valve 11, and exhaust conduit 12.

This period of the cycle is operated and controlled in the same manner as the preceding period and terminates with withdrawal of the slurry of solid diphenyl carbonate and aqueous solution from vessel 1' for separation.

Analysis of gases for phosgene may be effected by absorbing phosgene from the gases, in alkali, for example, in aqueous 50% KOH solution. If the gases contain substantial quantities of carbon dioxide or chlorine, it may be desirable to determine the proportion of these constituents and make the appropriate correction.

References in the claims to differences in phosgene contents of the inlet and exit gases refer to arithmetical differences; for example, if the phosgene concentration of a gas entering the reactor were 25% and the phosgene concentration of the gas leaving the reactor were 23%, the difference in phosgene contents would be 2%; if the exit concentration were 24%, the difference would be 1%.

The term "alkali" as used herein is intended to include the alkali-metals, e. g., sodium and potassium, and the ammonium radical.

The process of the present invention may be applied to the manufacture of diphenyl carbonates, such as diphenyl carbonate, guaiacol carbonate, and the dicresyl carbonates.

We claim:

1. The method of making a diphenyl carbonate, which comprises passing phosgene-containing gas into contact with a first quantity of alkali phenate solution whereby a part of the phosgene reacts with said alkali phenate to form diphenyl carbonate and by-product phenol, passing the unreacted gas from said first quantity of alkali phenate solution into contact with a second quantity of alkali phenate solution to react residual phosgene to form the diphenyl carbonate and continuing the passage of said gas until the phosgene concentration in the gas entering said first quantity of alkali phenate solution and the phosgene concentration in the gas entering said second quantity of alkali phenate solution differ by not more than 2%, thereupon converting the phenol present in said first quantity of solution to alkali phenate and passing phosgene-containing gas into contact with said first and second quantities of alkali phenate solution as aforesaid until the phosgene concentration in the gas entering said first quantity of alkali phenate solution and the phosgene concentration in the gas entering said second alkali phenate solution again differ by not more than 2%.

2. The method of making diphenyl carbonate, which comprises passing a gas containing between 15% and 50% of phosgene into contact with a first quantity of sodium phenate solution whereby a part of the phosgene reacts with said sodium phenate to form diphenyl carbonate and by-product phenol, passing the unreacted gas from said first quantity of sodium phenate solution into contact with a second quantity of sodium phenate solution to react residual phosgene to form diphenyl carbonate and continuing the passage of said gas until the phosgene concentration in the gas entering said first quantity of sodium phenate solution and the phosgene concentration in the gas entering said second quantity of sodium phenate solution differ by not more than 2%, thereupon converting phenol present in said first quantity of solution to sodium phenate and passing a gas containing between 15% and 50% of phosgene into contact with said first and second quantities of sodium phenate solution as aforesaid until the phosgene concentration in the gas entering said first quantity of sodium phenate solution and the phosgene concentration in the gas entering said second sodium phenate solution again differ by not more than 2%.

3. The method of making diphenyl carbonate, which comprises passing a gas containing between 15% and 50% of phosgene into contact with a first quantity of sodium phenate solution containing diphenyl carbonate and containing initially between about 3 mols and about 8 mols of sodium phenate for each mol of diphenyl carbonate present whereby a part of the phosgene reacts with the sodium phenate to form diphenyl carbonate and by-product phenol, passing the unreacted gas from said first quantity of sodium phenate solution into contact with a second quantity of sodium phenate solution to react residual phosgene to form diphenyl carbonate and regulating the rate of gas flow so that the gas entering said second quantity of sodium phenate initially does not contain more than 2% of phosgene, continuing the passage of said gas mixture as aforesaid until the phosgene concentrations in the gas mixtures entering the first and second quantities of sodium phenate solution differ by not more than 2%, thereupon converting phenol present in said first quantity of solution to sodium phenate and resuming passage of the gas containing between 15% and 50% of phosgene through said first and second quantities of sodium phenate solution as aforesaid until the phosgene concentration in the gas entering said first quantity of sodium phenate solution and the phosgene concentration in the gas entering said second quantity of sodium phenate solution again differ by not more than 2%.

4. The method of making diphenyl carbonate, which comprises passing a gas mixture containing between 15% and 50% of phosgene into contact with a first quantity of aqueous sodium phenate solution, whereby a part of the phosgene is reacted with sodium phenate to form diphenyl carbonate and a small proportion of by-product phenol, passing the unreacted portion of said gas mixture into contact with a second quantity of aqueous sodium phenate solution to react residual phosgene to form diphenyl carbonate, periodically determining the phosgene concentration in the gas mixture entering said first quantity of sodium phenate solution and the phosgene concentration in the gas mixture entering the second quantity of sodium phenate solution, and continuing the passage of said gas mixture as aforesaid until the phosgene concentrations in the gas mixtures entering the first and second quantities of sodium phenate solution differ by not more than 2%, thereupon converting phenol present in said first quantity of solution to sodium phenate and passing a gas mixture containing between 15% and 50% of phosgene into contact with said first and second quantites of sodium phenate solution as aforesaid until the phosgene concentration in the gas entering said first quantity of sodium phenate solution and the phosgene concentration in the gas entering the second quantity of sodium phenate solution again differ by not more than 2%, thereupon terminating the flow of phosgene gas into contact with said first quantity of solution and mechanically separating diphenyl carbonate therefrom.

5. The method of making diphenyl carbonate, which comprises passing a gas mixture containing between 15% and 50% of phosgene into contact with a first quantity of aqueous sodium phenate solution at a pressure below three atmospheres absolute at a temperature maintained between 16° and 24° C. whereby a part of the phosgene is reacted with sodium phenate to form diphenyl carbonate and a small proportion of by-product phenol, passing the unreacted portion of said gas mixture into contact with a second quantity of aqueous sodium phenate solution at a pressure below three atmospheres absolute and a temperature maintained between 16° and 24° C. to react residual phosgene to form diphenyl carbonate, periodically determining the phosgene concentration in the gas mixture entering said first quantity of sodium phenate solution and the phosgene concentration in the gas mixture entering the second quantity of sodium phenate solution, and continuing the passage of said gas mixture as aforesaid until the phosgene concentrations in the gas mixtures entering the first and second quantities of sodium phenate solution differ by not more than 2%, thereupon converting phenol present in said first quantity of solution to sodium phenate and passing a gas mixture containing between 15% and 50% of phosgene into contact with said first and second quantities of sodium phenate solution as aforesaid until the phosgene concentration in the gas entering said first quantity of sodium phenate solution and the phosgene concentration in the gas entering said second sodium phenate solution again differ by not more than 2%, thereupon terminating the flow of phosgene gas into contact with said first quantity of solution and mechanically separating solid diphenyl carbonate therefrom.

6. In the manufacture of diphenyl carbonate by bringing gaseous phosgene into reactive contact with a batch of alkali phenate solution, the improvement which comprises effecting such contact in the presence of sufficient diluent gas to provide a gas mixture having a phosgene content between 15% and 50% and adjusting the rate of flow of gas to reduce the phosgene content of the gas to not more than 2%, maintaining the rate of flow of gas substantially constant until the phosgene concentration of exit gas from said batch is within 2% of the inlet concentration thereof, thereupon converting phenol present in said batch to alkali phenate and again passing a gas mixture having a phosgene content between 15% and 50% into reactive contact with said batch at substantially the rate of gas flow aforesaid and continuing the passage of said gas into contact with said batch until the phosgene concentration of exit gas from said batch is within 2% of the inlet concentration thereof.

7. The method of making diphenyl carbonate, which comprises passing a gas mixture containing between 15% and 50% of phosgene into contact with a first quantity of aqueous sodium phenate solution at a pressure below three atmospheres absolute at a temperature maintained between 16° and 24° C. whereby a part of the phosgene is reacted with sodium phenate to form diphenyl carbonate and a small proportion of by-product phenol, adjusting the rate of flow of gas to reduce the phosgene content of the gas to not more than 2% in its passage into contact with said first quantity of aqueous sodium phenate solution, passing the unreacted portion of said gas mixture into contact with a second quantity of aqueous sodium phenate solution at a pressure below three atmospheres absolute and a temperature maintained between 16° C. and 24° C. to react residual phosgene to form diphenyl carbonate, periodically determining the phosgene concentration in the gas mixture entering said first quantity of sodium phenate solution and the phosgene concentration in the gas mixture entering the second quantity of sodium phenate solution, and continuing the passage of said gas mixture at a substantially constant rate until the phosgene concentrations in the gas mixtures entering the first and second quantities of sodium phenate solution differ by not more than 2%, thereupon converting phenol present in said first quantity of solution to sodium phenate and passing a gas mixture containing between 15% and 50% of phosgene serially into contact with said first and second quantities of sodium phenate solution at substantially the same rate of gas flow previously employed, until the phosgene concentration in the gas entering said first quantity of sodium phenate solution and the phosgene concentration in the gas entering said second sodium phenate solution again differ by not more than 2%, thereupon terminating the flow of phosgene gas into contact with said first quantity of solution and mechanically separating solid diphenyl carbonate therefrom.

8. The method for making a diphenyl carbonate which comprises contacting phosgene-containing gas with alkali phenate solution, whereby phosgene reacts with alkali phenate to form diphenyl carbonate and by-product phenol, until the phosgene concentration of the gas mixture introduced into contact with said solution and the phosgene concentration of the gas mixture exiting said solution differ by not more than 2%, thereupon converting phenol present in said solution to alkali phenate, and then contacting phosgene-containing gas with the resulting solution until the phosgene concentration of the gas mixture entering such contacting operation and the phosgene concentration of the gas mixture exiting such contacting operation differ by not more than 2%.

JOHN H. PEARSON.
SAGER TRYON.